(12) United States Patent
Woerz et al.

(10) Patent No.: US 11,834,025 B2
(45) Date of Patent: Dec. 5, 2023

(54) DEVICE AND METHOD FOR DETERMINING AT LEAST ONE BRAKE CHARACTERISTIC VALUE OF A HYDRAULIC BRAKING SYSTEM OF A VEHICLE

(71) Applicant: Robert Bosch GmbH, Stuttgart (DE)

(72) Inventors: Christian Woerz, Beilstein (DE); Franz Dahlke, Karlsruhe (DE); Andres Alvarez Noriega, Untergruppenbach (DE); Dirk Foerch, Neuenstadt/Stein (DE); Marcus Bucher, Bad Rappenau (DE); Markus Lang, Bad Boll (DE)

(73) Assignee: ROBERT BOSCH GMBH, Stuttgart (DE)

( * ) Notice: Subject to any disclaimer, the term of this patent is extended or adjusted under 35 U.S.C. 154(b) by 320 days.

(21) Appl. No.: 16/901,387

(22) Filed: Jun. 15, 2020

(65) Prior Publication Data
US 2020/0398801 A1 Dec. 24, 2020

(30) Foreign Application Priority Data

Jun. 18, 2019 (DE) .......................... 102019208811.2

(51) Int. Cl.
*B60T 8/172* (2006.01)
*B60T 8/171* (2006.01)
(Continued)

(52) U.S. Cl.
CPC .............. *B60T 8/172* (2013.01); *B60T 8/171* (2013.01); *B60T 8/323* (2013.01); *B60T 8/326* (2013.01);
(Continued)

(58) Field of Classification Search
CPC .......... B60T 8/172; B60T 8/171; B60T 8/323; B60T 8/326; B60T 13/66; B60T 13/74; B60T 17/22; B60T 2220/04
See application file for complete search history.

(56) References Cited

U.S. PATENT DOCUMENTS 5,417,482 A * 5/1995 Kashima ................. B60T 8/266
303/112
5,918,951 A * 7/1999 Rudd, III ............ B60T 8/17616
303/112
(Continued)

FOREIGN PATENT DOCUMENTS

DE 102014213354 A1 1/2016

*Primary Examiner* — Yazan A Soofi
*Assistant Examiner* — Naeem Taslim Alam
(74) *Attorney, Agent, or Firm* — NORTON ROSE FULBRIGHT US LLP; Gerard Messina

(57) ABSTRACT

A device for a hydraulic braking system of a vehicle. The device includes a processing unit, which is programmed to determine at least one brake characteristic value of the hydraulic braking system, the processing unit being programmed to determine the at least one brake characteristic value as a vehicle axle-specific brake characteristic value, which in each case corresponds to a ratio between a brake pressure in all wheel brake cylinders assigned to a shared vehicle axle of the vehicle and a vehicle axle braking torque exerted on the shared vehicle axle with the aid of the wheel brake cylinders. A method for determining at least one brake characteristic value of a hydraulic braking system of a vehicle, and a method for decelerating a vehicle with a hydraulic braking system and an electric motor usable as a generator, are also described.

10 Claims, 5 Drawing Sheets determine at least one vehicle axle-specific brake characteristic value — S1

$C_{p\text{-front}}, C_{p\text{-rear}}, a_{front}/a_{rear}$ activate at least one braking system component or the electric motor — S2

(51) Int. Cl.
  *B60T 13/66* (2006.01)
  *B60T 13/74* (2006.01)
  *B60T 17/22* (2006.01)
  *B60T 8/32* (2006.01)

(52) U.S. Cl.
  CPC .............. *B60T 13/66* (2013.01); *B60T 13/74* (2013.01); *B60T 17/22* (2013.01); *B60T 2220/04* (2013.01)

(56) References Cited

U.S. PATENT DOCUMENTS

| | | | | |
|---|---|---|---|---|
| 6,378,669 | B1* | 4/2002 | Kurasako | B60T 13/662 |
| | | | | 188/218 XL |
| 6,415,215 | B1* | 7/2002 | Nishizaki | B62D 6/003 |
| | | | | 701/72 |
| 2001/0015299 | A1* | 8/2001 | Moore | B60K 6/40 |
| | | | | 180/197 |
| 2003/0025035 | A1* | 2/2003 | Park | B64C 25/46 |
| | | | | 244/111 |
| 2005/0001474 | A1* | 1/2005 | Zierolf | B60T 8/325 |
| | | | | 303/112 |
| 2005/0125107 | A1* | 6/2005 | Schmidt | B60T 7/122 |
| | | | | 701/1 |
| 2006/0121325 | A1* | 6/2006 | Beguery | B60L 58/40 |
| | | | | 429/444 |
| 2008/0210497 | A1* | 9/2008 | Jeon | B60T 8/267 |
| | | | | 188/72.1 |
| 2009/0115244 | A1* | 5/2009 | Schluter | B60T 13/686 |
| | | | | 303/114.1 |
| 2010/0275593 | A1* | 11/2010 | Okada | B60T 13/162 |
| | | | | 60/545 |
| 2015/0066326 | A1* | 3/2015 | Furuyama | B60T 13/146 |
| | | | | 303/10 |
| 2016/0016574 | A1* | 1/2016 | Yang | G01L 5/286 |
| | | | | 702/34 |
| 2017/0174202 | A1* | 6/2017 | Sasaki | B60L 15/2009 |
| 2019/0092174 | A1* | 3/2019 | Lee | B60T 13/662 |
| 2019/0176784 | A1* | 6/2019 | Laine | B60T 8/172 |
| 2020/0156602 | A1* | 5/2020 | Wiehen | B60T 7/12 |
| 2020/0232531 | A1* | 7/2020 | Robere | F16D 66/00 |
| 2020/0398799 | A1* | 12/2020 | Waenninger | B60T 13/662 |

\* cited by examiner

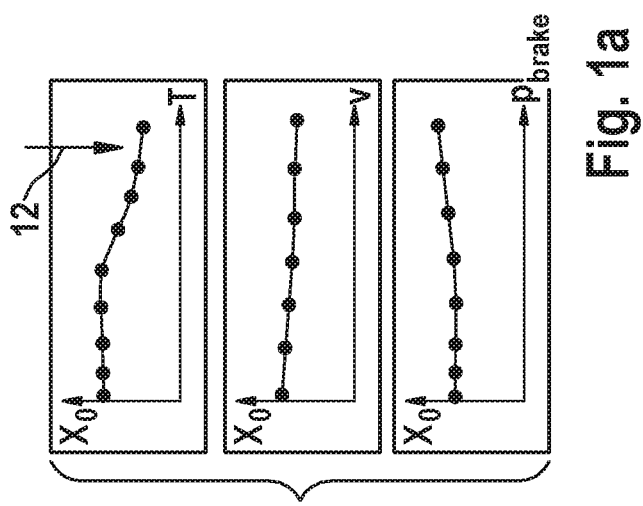
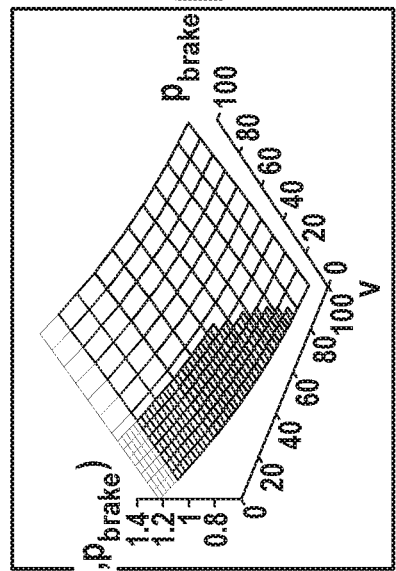
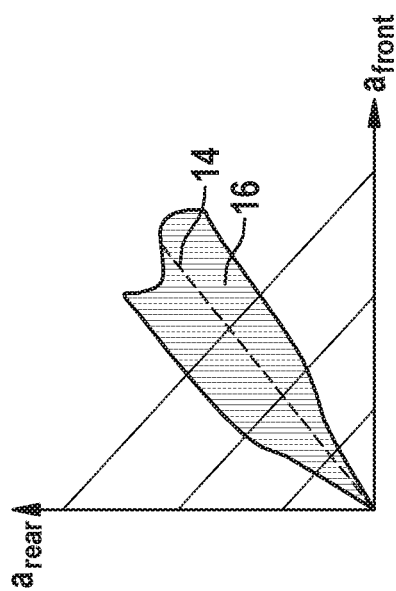
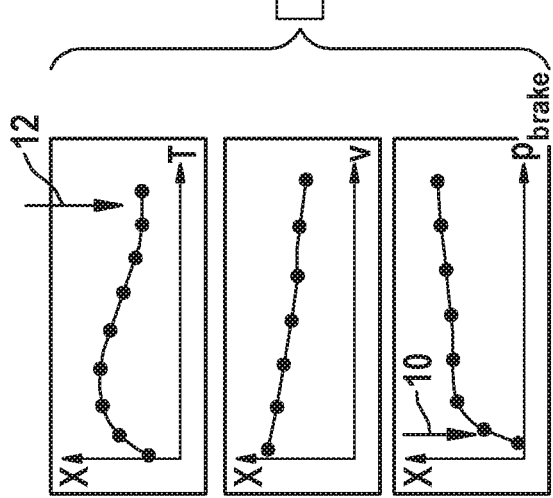
Fig. 1a
Fig. 1b

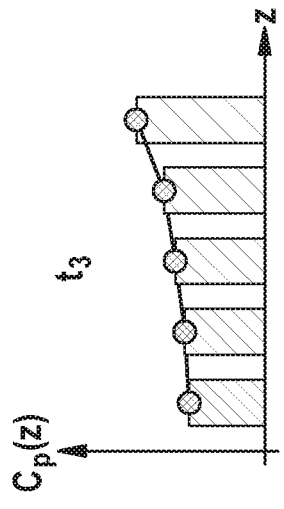 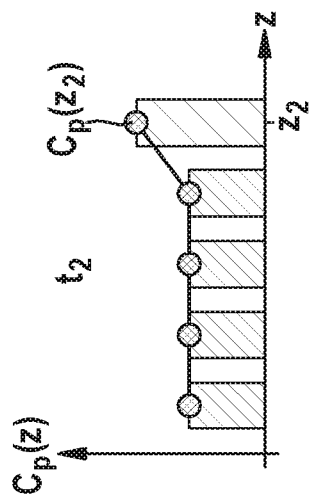 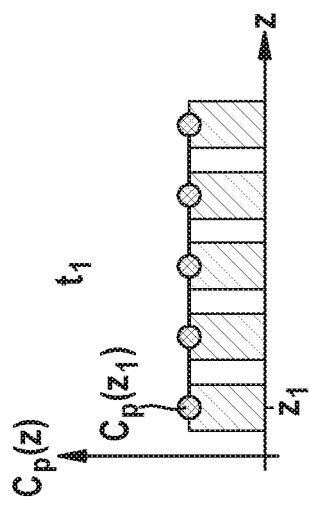
Fig. 3Aa  Fig. 3Ba  Fig. 3Ca
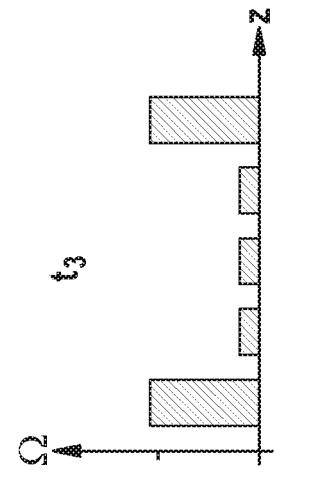 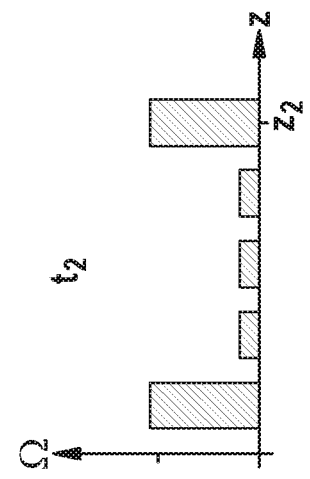 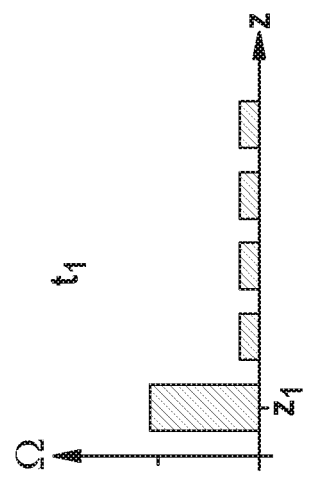
Fig. 3Ab  Fig. 3Bb  Fig. 3Cb

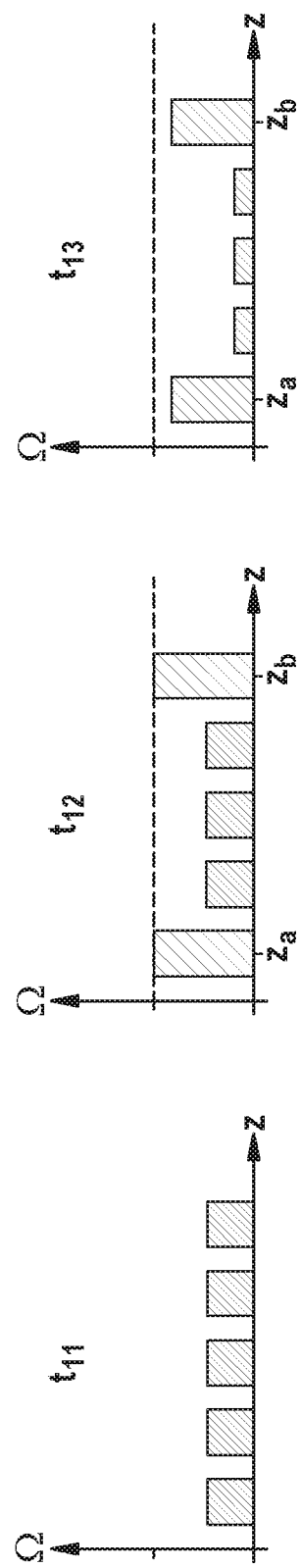

DEVICE AND METHOD FOR DETERMINING AT LEAST ONE BRAKE CHARACTERISTIC VALUE OF A HYDRAULIC BRAKING SYSTEM OF A VEHICLE

CROSS REFERENCE

The present application claims the benefit under 35 U.S.C. § 119 of German Patent Application No. DE 102019208811.2 filed on Jun. 18, 2019, which is expressly incorporated herein by reference in its entirety.

FIELD

The present invention relates to a device for a hydraulic braking system of a vehicle and to a hydraulic braking system for a vehicle. The present invention also relates to a method for determining at least one brake characteristic value of a hydraulic braking system of a vehicle. The present invention furthermore relates to a method for decelerating a vehicle with a hydraulic braking system and an electric motor usable as a generator.

BACKGROUND INFORMATION

With the aid of some conventional braking systems and methods, a vehicle is selectively deceleratable with the aid of at least one of its wheel brake cylinders, with the aid of its electric motor usable as a generator, or with the aid of the at least one of its wheel brake cylinders and with the aid of the electric motor. Such a braking system for a vehicle and a corresponding method for operating a braking system of a vehicle are described, for example, in German Patent Application No. DE 10 2014 213 354 A1.

SUMMARY

The present invention provides a device for a hydraulic braking system of a vehicle, a hydraulic braking system for a vehicle, a method for determining at least one brake characteristic value of a hydraulic braking system of a vehicle, and a method for decelerating a vehicle with a hydraulic braking system and an electric motor usable as a generator.

The present invention provides options for determining/establishing at least one brake characteristic value of a hydraulic braking system of a vehicle as a vehicle axle-specific brake characteristic value, by which the at least one determined/established vehicle axle-specific brake characteristic value is better suited for the later activation of at least one braking system component of the hydraulic braking system and/or of an electric motor, usable as a generator, of the vehicle equipped with the hydraulic braking system. As is described in greater detail hereafter, the at least one vehicle axle-specific brake characteristic value allows, in particular, a more deceleration fluctuation-free transition between a deceleration of the particular vehicle only with the aid of at least one wheel brake cylinder of its hydraulic braking system and a deceleration of the particular vehicle only with the aid of its electric motor. The present invention thus enhances a comfort for a driver of a vehicle designed for recuperative braking as a result of its being equipped with the electric motor which is usable as a generator. The present invention thus contributes to prompting drivers to purchase an energy-saving, and potentially also lower-emission, vehicle type.

In one advantageous specific embodiment of the device according to the present invention, the processing unit is programmed to determine the at least one vehicle axle-specific brake characteristic value as a vehicle axle-specific brake characteristic value function, which is at least dependent on the brake pressure. Such a vehicle axle-specific brake characteristic value function is advantageously suitable for reproducing a vehicle axle braking torque exerted on the vehicle axle at a specific brake pressure in the wheel brake cylinders assigned to the particular vehicle axle.

As an alternative or in addition, the processing unit may also be programmed to determine the at least one vehicle axle-specific brake characteristic value as a vehicle axle-specific brake characteristic value function, which is at least dependent on at least one vehicle state variable of the vehicle, on at least one driving state variable of an instantaneous trip of the vehicle, on at least one climatic state variable and/or on at least one braking system component temperature. The specific vehicle axle-specific brake characteristic value function may thus address dependencies of the vehicle axle braking torque exerted on the particular vehicle axle of at least one of the variables described here.

The processing unit may also be programmed to determine the at least one vehicle axle-specific brake characteristic value as a vehicle axle-specific brake characteristic value function, which is at least dependent on a time which has elapsed after an installation of a new brake pad of the hydraulic braking system or an identified damage of a friction layer of the hydraulic braking system and/or a number of brake applications of the vehicle carried out after the installation of a new brake pad or after the identified damage of the friction layer. It may thus also be taken into consideration, during the determination of the at least one vehicle axle-specific brake characteristic value function, that a friction pairing between the new brake pad and a brake disk cooperating therewith, in general, has a considerably lower friction coefficient after the installation of the new brake pad, until a stable friction layer develops, due to the brake disk being repeatedly brought in contact with the brake pad, and the friction coefficient of the friction pairing reaches its standard nominal value. This process is frequently referred to as "bedding." It may also be taken into consideration, during the determination of the at least one vehicle axle-specific brake characteristic value function, that the identified damage of the friction layer, which is attributable, for example, to an excessive stress on the brake pad during a steep mountain descent (i.e., a so-called "fading"), is typically only eliminated after several brake applications through a "regeneration of the friction layer." A so-called "fading recovery" may thus also be taken into consideration with the aid of the specific embodiment of the device described here.

In one further advantageous specific embodiment, the device includes a memory unit on which the assigned vehicle axle-specific brake characteristic value or the assigned vehicle axle-specific brake characteristic value function for the at least one vehicle axle of the vehicle is stored, the processing unit being programmed to re-establish the assigned vehicle axle-specific brake characteristic value or the assigned vehicle axle-specific brake characteristic value function for the at least one vehicle axle, based on a comparison of at least one setpoint variable with respect to a setpoint deceleration to be exerted on the particular vehicle axle during a brake application of the vehicle to at least one actual variable with respect to an actual deceleration exerted on the particular vehicle axle during the brake application, and to newly store it on the memory unit. The specific embodiment of the device described here may thus utilize pieces of information, which conventionally are already available, with respect to the setpoint deceleration to be exerted on the particular vehicle axle during a brake application of the vehicle, and with respect to the actual deceleration exerted on the particular vehicle axle during the brake application, for re-establishing the particular vehicle axle-specific brake characteristic value or the particular vehicle axle-specific brake characteristic value function. It is therefore, in general, not necessary to equip a vehicle including a specific embodiment of the device described here with an additional sensor system.

In one advantageous refinement of the present invention, the device includes a control unit, which is designed to activate at least one braking system component of the hydraulic braking system, and an electric motor of the vehicle usable as a generator, taking into consideration at least one signal, which is output to the control unit, with respect to a brake application of the vehicle requested by a driver of the vehicle or an automatic speed control unit of the vehicle, the at least one braking system component and the electric motor being activatable, with the aid of at least one control signal of the control unit, in such a way that the vehicle is deceleratable with the aid of its hydraulic braking system and/or its electric motor, and the control unit additionally being designed to output the at least one control signal, taking the at least one vehicle axle-specific brake characteristic value into consideration. As is described hereafter in greater detail, the refinement described here may use both the hydraulic braking system and the electric motor in such a way, for decelerating the vehicle, that the brake application of the vehicle requested by the driver or the automatic speed control unit may be carried out without an occurrence of deceleration fluctuations.

The above-described advantages are also ensured in the case of a hydraulic braking system for a vehicle including such a device and at least the wheel brake cylinders assigned to the shared vehicle axle of the vehicle.

Carrying out a corresponding method for determining at least one brake characteristic value of a hydraulic braking system of a vehicle also yields the above-described advantages.

In addition, carrying out a corresponding method for decelerating a vehicle with a hydraulic braking system and an electric motor usable as a generator also yields the above-described advantages. In one advantageous specific embodiment of the method, at least one setpoint brake pressure variable with respect to at least one setpoint brake pressure to be set in the hydraulic braking system and/or a setpoint generator braking torque variable with respect to a setpoint generator braking torque to be effectuated with the aid of the electric motor is/are established for actuating the at least one braking system component and/or the electric motor, taking a braking intensity of the brake application of the vehicle which is instantaneously requested by the driver or the automatic vehicle unit into consideration, and additionally taking the at least one vehicle axle-specific brake characteristic value into consideration, the at least one established setpoint brake pressure variable and/or the established setpoint generator braking torque variable also being taken into consideration during the activation of the at least one braking system component and/or of the electric motor.

It is explicitly pointed out that the methods described in the two preceding paragraphs may be refined according to the above-described specific embodiments of the device.

BRIEF DESCRIPTION OF THE DRAWING

Further features and advantages of the present invention are described hereafter based on the figures.

FIGS. 1a and 1b show coordinate systems for explaining a first specific embodiment of the method for determining at least one brake characteristic value of a hydraulic braking system of a vehicle in accordance with the present invention.

FIGS. 3Aa through 3Cb show coordinate systems for explaining a third specific embodiment of the method for determining at least one brake characteristic value of a hydraulic braking system of a vehicle in accordance with the present invention.

FIGS. 4A through 4C show coordinate systems for explaining a fourth specific embodiment of the method for determining at least one brake characteristic value of a hydraulic braking system of a vehicle in accordance with the present invention.

DETAILED DESCRIPTION OF EXAMPLE EMBODIMENTS

Figure 2A:
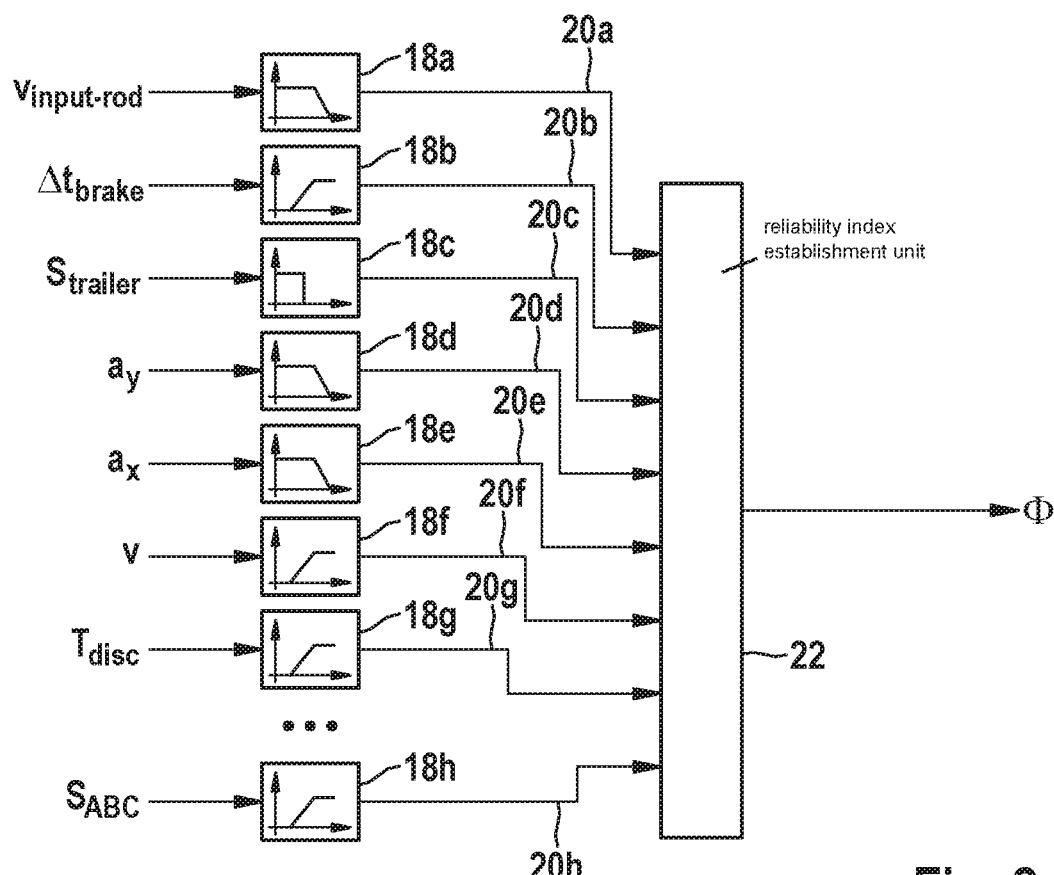
FIGS. 2a and 2b show a schematic partial representation of a processing unit and a coordinate system for explaining a second specific embodiment of the method for determining at least one brake characteristic value of a hydraulic braking system of a vehicle in accordance with the present invention.

FIGS. 1a and 1b show coordinate systems for explaining a first specific embodiment of the method for determining at least one brake characteristic value of a hydraulic braking system of a vehicle.

When the example method shown schematically with the aid of FIGS. 1a and 1b is carried out, the at least one brake characteristic value is determined as a vehicle axle-specific brake characteristic value $C_p$. The at least one vehicle axle-specific brake characteristic value $C_p$ shall be understood to mean a value which in each case corresponds to a ratio between a brake pressure $p_{brake}$ in all wheel brake cylinders assigned to a shared vehicle axle of the vehicle and a vehicle axle braking torque $B_{brake}$ exerted on the shared vehicle axle with the aid of the wheel brake cylinders. The at least one vehicle axle-specific brake characteristic value $C_p$ may, in particular, correspond in each case to a quotient of the particular vehicle axle braking torque $B_{brake}$ exerted on the shared vehicle axle divided by the corresponding brake pressure $p_{brake}$ in all wheel brake cylinders assigned to the shared vehicle axle. The at least one vehicle axle-specific brake characteristic value $C_p$ may therefore, in particular, be established in the unit Nm/bar (newton meters/bar). The term "Cp value" or the term "friction coefficient" is also frequently used for the term "brake characteristic value." The at least one vehicle axle-specific brake characteristic value $C_p$ may thus also be understood to mean at least one vehicle axle-specific Cp value and/or at least one vehicle axle-specific friction coefficient.

For example, at least one front axle brake characteristic value $C_{p\text{-}front}$ may be determined for a front axle of the vehicle and/or at least one rear axle characteristic value $C_{p\text{-}rear}$ may be determined for a rear axle of the vehicle, as the at least one vehicle axle-specific brake characteristic value $C_p$. The at least one front axle brake characteristic value $C_{p\text{-}front}$ may, in particular, correspond to a quotient of front axle braking torque $B_{brake-front}$ exerted on the front axle with the aid of the front axle wheel brake cylinders at a specific brake pressure $p_{brake}$ in the front axle wheel brake cylinders, divided by brake pressure $p_{brake}$. Corresponding thereto, the at least one rear axle brake characteristic value $C_{p-rear}$ may, in particular, correspond to a quotient of rear axle braking torque $B_{brake-rear}$ exerted on the rear axle with the aid of the rear axle wheel brake cylinders at a brake pressure $p_{brake}$ in the rear axle wheel brake cylinders, divided by brake pressure $p_{brake}$.

The example method described here is an option which is easy to carry out for detecting/determining a change of the at least one vehicle axle-specific brake characteristic value $C_p$ during an operation of the hydraulic braking system. In this way, the at least one vehicle axle-specific brake characteristic value $C_p$ may be continuously adapted during the entire service life of the hydraulic braking system, or the entire vehicle service life, in such a way that a corresponding axle-specific knowledge is available at all times. This axle-specific knowledge of the hydraulic braking system may advantageously be used at least for activating at least one braking system component of the hydraulic braking system, and potentially also for activating at least one further vehicle component of the vehicle. The at least one further vehicle component may, e.g., be an electric machine of the vehicle.

An algorithm may be used to determine the at least one vehicle axle-specific brake characteristic value $C_p$, which offers the option of establishing, in an axle-specific manner, the conversion of brake pressure $p_{brake}$ in the wheel brake cylinders assigned to the particular vehicle axle into vehicle axle braking torque $B_{brake}$ exerted on this vehicle axle. In particular, a combination of parameterization and adaption may be used as the algorithm. Such an algorithm is scalable and, via its degree of characteristics, may be designed both for scalable non-adapting corrections and for an axle-specific correction. Software suitable for carrying out such an algorithm is comparatively cost-effective and requires relatively little installation space.

As is shown in the middle coordinate system of FIG. 1a, the at least one vehicle axle-specific brake characteristic value $C_p$ may specifically be determined as a vehicle axle-specific brake characteristic value function $C_p(v, p_{brake})$, vehicle axle-specific brake characteristic value function $C_p(v, p_{brake})$ being dependent at least on brake pressure $p_{brake}$, on at least one vehicle state variable of the vehicle, on at least one driving state variable v of an instantaneous trip of the vehicle, on at least one climatic state variable and/or on at least one braking system component temperature T. In the example of FIG. 1a, vehicle axle-specific brake characteristic value function $C_p(v, p_{brake})$, which may be a front axle brake characteristic value function or a rear axle brake characteristic value function, for example, is dependent on brake pressure $p_{brake}$, and dependent on a speed v of the instantaneous trip of the vehicle. As an alternative or in addition, vehicle axle-specific brake characteristic value function $C_p(v, p_{brake})$ may also be dependent on at least one further of the above-described variables. Brake characteristic value function $C_p(v, p_{brake})$ may preferably also be dependent on at least one brake disk temperature of at least one brake disk of the hydraulic braking system and/or on at least one brake pad temperature of at least one brake pad of the hydraulic braking system (as the at least one braking system component temperature T). An estimation of the at least one brake disk temperature and/or of the at least one brake pad temperature may be easily carried out with the aid of a brake temperature model (BTM).

In the example of FIG. 1a, vehicle axle-specific brake characteristic value function $C_p(v, p_{brake})$ is a "two-dimensional characteristic map." Vehicle axle-specific brake characteristic value function $C_p(v, p_{brake})$, however, may also be a "three- or higher-dimensional function."

As an alternative or in addition, the at least one vehicle axle-specific brake characteristic value function $C_p(v, p_{brake})$ may also be determined in such a way that the at least one vehicle axle-specific brake characteristic value function $C_p(v, p_{brake})$ is at least dependent on a time which has elapsed since an installation of a new brake pad of the hydraulic braking system or after an identified damage of a friction layer of the hydraulic braking system and/or a number of brake applications of the vehicle carried out after the installation of the new brake pad or after the identified damage of the friction layer. In this way, it is also possible to take effects which are frequently referred to as "bedding" or "fading recovery" into consideration during the determination of the at least one vehicle axle-specific brake characteristic value function $C_p(v, p_{brake})$.

With the aid of the establishment of the at least one vehicle axle-specific brake characteristic value $C_p$ as the at least one vehicle axle-specific brake characteristic value function $C_p(v, p_{brake})$, it is possible to take into consideration that vehicle state variables, driving state variables v, climatic state variables and/or braking system component temperatures I, but also a "bedding" or a "fading recovery," frequently have an effect on the conversion of brake pressure $p_{brake}$ into vehicle axle braking torque $B_{brake}$ exerted on the vehicle axle in the wheel brake cylinders assigned to the shared vehicle axle.

The at least one vehicle axle-specific brake characteristic value function $C_p(v, p_{brake})$ may also be referred to as a vehicle axle-specific brake characteristic value map. A resolution/characteristic map width of the particular vehicle axle-specific brake characteristic value function $C_p(v, p_{brake})$ may have at least two different values. For example, vehicle axle-specific brake characteristic value function $C_p(v, p_{brake})$ may have a higher resolution/lower characteristic map width for certain "sensitive" value ranges, and a lower resolution/higher characteristic map width for other "less sensitive" value ranges. In this way, a storage capacity required for storing vehicle axle-specific brake characteristic value function $C_p(v, p_{brake})$ may be kept low, vehicle axle-specific brake characteristic value function $C_p(v, p_{brake})$ nonetheless having a comparatively high resolution/low characteristic map width for the "sensitive" value ranges.

In the method shown with the aid of FIG. 1a, vehicle axle-specific brake characteristic value function $C_p(v, p_{brake})$ is determined/re-established based on a comparison of at least one setpoint variable $X_0$ with respect to a setpoint deceleration to be exerted on the particular vehicle axle during a brake application of the vehicle, to at least one actual variable X with respect to an actual deceleration exerted on the particular vehicle axle. The at least one setpoint variable $X_0$ may, e.g., be understood to mean at least one braking torque to be exerted on the particular vehicle axle and/or at least one deceleration to be exerted on the particular vehicle axle. Accordingly, the at least one actual variable X may, for example, be understood to mean at least one braking torque $B_{brake}$ exerted on the particular vehicle axle and/or at least one deceleration exerted on the particular vehicle axle. It is expressly pointed out that the ascertainment of the at least one actual variable X during a brake application of the vehicle is not limited to the use of a specific sensor type. For example, a deceleration sensor and/or a wheel speed sensor may optionally be used to ascertain the at least one actual variable X. During the comparison of the at least one actual variable X to the at least one setpoint variable $X_0$, at least one driving state variable and/or at least one vehicle state variable, such as a driving resistance and/or a vehicle mass, may also be evaluated.

On the left, FIG. 1a represents coordinate systems which show the at least one actual variable X as a function of braking system component temperature T, speed v or brake pressure $p_{brake}$. On the right, FIG. 1b represents the coordinate systems which show the at least one setpoint variable $X_0$ as a function of braking system component temperature T, speed v or brake pressure $p_{brake}$. As is shown in FIG. 1a with the aid of arrow 10, an influence of an air gap on braking torque $B_{brake}$ exerted on the vehicle axle may be "hidden" from the driver. If it is desired that an influence of braking system component temperature T on exerted braking torque $B_{brake}$ is only "filtered out" in so-called comfort ranges, a "filtering out" of temperature effects may be dispensed with at relatively high values for braking system component temperature T. This is also represented with the aid of arrows 12 in FIG. 1a.

As is also schematically shown with the aid of the coordinate system of FIG. 1b, it is possible, for example, to calculate a (hydraulic) brake force distribution occurring at the vehicle during a (purely hydraulic) brake application more precisely with the aid of the knowledge of vehicle axle-specific brake characteristic values $C_p$ of the vehicle axles of the vehicle. The (hydraulic) brake force distribution may be understood to mean a quotient of a front axle deceleration $a_{front}$, which is exerted on the front axle of the vehicle with the aid of the front axle wheel brake cylinders, divided by a sum of front axle deceleration $a_{front}$ and a rear axle deceleration $a_{rear}$, which is exerted on the rear axle of the vehicle with the aid of the rear axle wheel brake cylinders. In general, the quotient is (approximately) 2:3 on a line 14. (In particular, a tail-heavy (hydraulic) brake force distribution is, in general, undesirable.)

With the aid of the knowledge of vehicle axle-specific brake characteristic values $C_p$ of the hydraulic braking system, it is possible to identify whether the instantaneous hydraulic brake force distribution deviates from line 14, e.g., is in hatched area 16 of the coordinate system of FIG. 1b. By appropriately activating the at least one braking system component of the hydraulic braking system, in particular, by varying brake pressure $p_{brake}$ in the front axle wheel brake cylinders and in the rear axle wheel brake cylinders, the (hydraulic) brake force distribution according to line 14 may be set.

As is described in more detail hereafter, additionally the electric motor (potentially in addition to the at least one braking system component of the hydraulic braking system) may advantageously furthermore also be activated during a use of an electric motor of the vehicle, usable as a generator, for decelerating the vehicle, utilizing vehicle axle-specific brake characteristic values $C_p$.

Figure 2B:
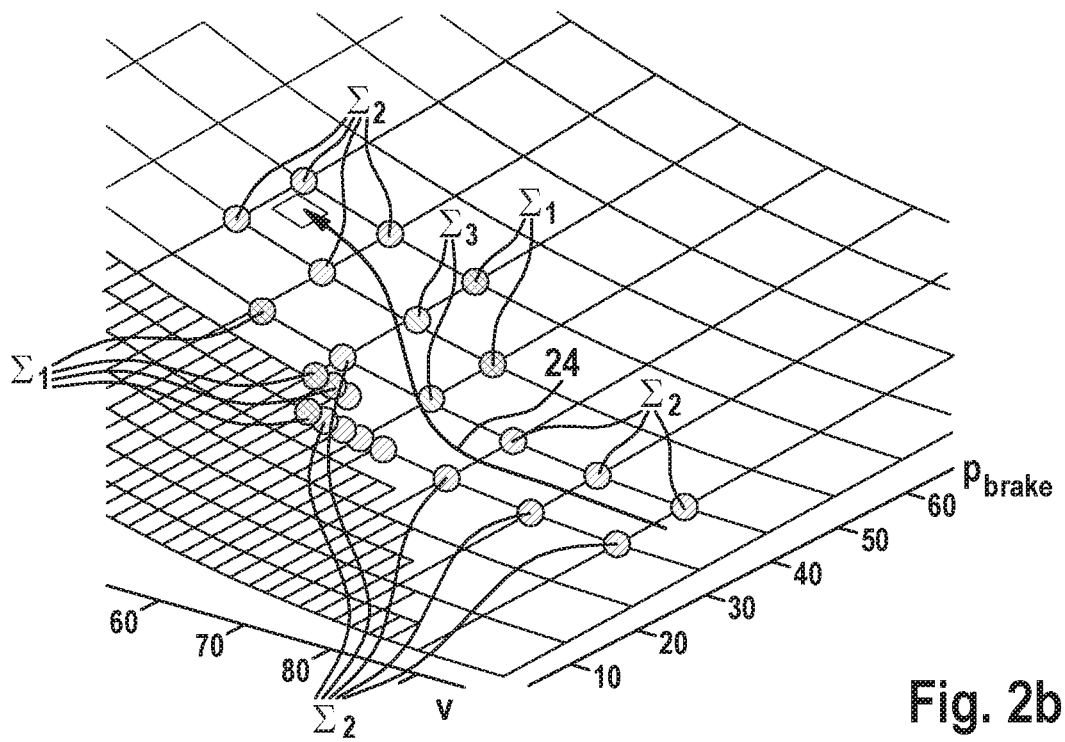

FIGS. 2a and 2b show a schematic partial representation of a processing unit and a coordinate system for explaining a second specific embodiment of the method for determining at least one brake characteristic value of a hydraulic braking system of a vehicle.

The method shown schematically with the aid of FIGS. 2a and 2b is a refinement of the above-described specific embodiment. For determining the particular vehicle axle-specific brake characteristic value function $C_p(v, p_{brake})$ for the at least one vehicle axle of the vehicle, in the method of FIGS. 2a and 2b the particular vehicle axle-specific brake characteristic value function is re-established by the comparison of the at least one setpoint variable $X_0$, with respect to the setpoint deceleration to be exerted on the particular vehicle axle during a brake application of the vehicle, to the at least one actual variable X with respect to the actual deceleration exerted on the at least one vehicle axle during the brake application.

In the specific embodiment of the method shown schematically with the aid of FIGS. 2a and 2b, a reliability index (trust ability index) $\Phi$ for the at least one re-established value of vehicle axle-specific brake characteristic value function $C_p(v, p_{brake})$ is also additionally ascertained during a re-establishment of at least one value of vehicle axle-specific brake characteristic value function $C_p(v, p_{brake})$. For this purpose, at least one vehicle state variable $v_{input-rod}$, $S_{trailer}$ and $S_{ABS}$ of the vehicle, at least one driving state variable $\Delta t_{brake}$, $a_y$, $a_x$ and v of the instantaneous trip of the vehicle and/or at least one braking system component temperature $T_{disc}$ are detected and evaluated with respect to reliability index $\Phi$. The at least one vehicle state variable $v_{input-rod}$, $S_{trailer}$ and $S_{ABS}$, the at least one driving state variable $\Delta t_{brake}$, $a_y$, $a_x$ and v and/or the at least one braking system component temperature $T_{disc}$ may, for example, be an input rod speed $v_{input-rod}$, a braking time $\Delta t_{brake}$ (which, for example, frequently provides information as to whether water is still present on the at least one brake disk), a trailer status $S_{trailer}$ (which indicates whether a trailer is attached to the vehicle), a transverse acceleration $a_y$ of the vehicle, a longitudinal acceleration $a_x$ of the vehicle, the speed v of the vehicle, at least one braking system component temperature $T_{disc}$ and/or an ABS status $S_{ABS}$ (which indicates whether an ABS function is being carried out). Further variables to also be taken into consideration for establishing reliability index $\Phi$ are, e.g., a driving resistance, a roadway gradient and/or a vehicle mass. If, for example, the vehicle mass is only estimated with high tolerances, this may reduce reliability index $\Phi$.

The processing unit shown schematically in FIG. 2a includes comparison units 18a through 18h, which compare the at least one vehicle state variable $v_{input-rod}$, $S_{trailer}$ and $S_{ABS}$, the at least one driving state variable $\Delta t_{brake}$, $a_y$, $a_x$ and v and/or the at least one braking system component temperature $T_{disc}$ to predefined normal value ranges. Based on signals 20a through 20h of comparison units 18a through 18h, a reliability index establishment unit 22 then establishes reliability index $\Phi$. If the at least one vehicle state variable $v_{input-rod}$, $S_{trailer}$ and $S_{ABS}$, the at least one driving state variable $\Delta t_{brake}$, $a_y$, $a_x$ and v and/or the at least one braking system component temperature $T_{disc}$ are within their normal value range, a relatively high reliability index $\Phi$ is preferably established for the at least one re-established value of vehicle axle-specific brake characteristic value function $C_p(v, p_{brake})$. If the at least one vehicle state variable $v_{input-rod}$, $S_{trailer}$ and $S_{ABS}$, the at least one driving state variable $\Delta t_{brake}$, $a_y$, $a_x$ and v and/or the at least one braking system component temperature $T_{disc}$ are outside their normal value range, a comparatively low reliability index $\Phi$ may be established for the at least one re-established value of vehicle axle-specific brake characteristic value function $C_p(v, p_{brake})$. Optionally, if the vehicle is equipped with a trailer and/or if an ABS function is carried out, the re-establishment of at least one value of vehicle axle-specific brake characteristic value function $C_p(v, p_{brake})$ may also be dispensed with.

Values for vehicle axle-specific brake characteristic value function $C_p(v, p_{brake})$ gained from the comparison of the at least one setpoint variable $X_0$ to the at least one actual variable X are plotted in the coordinate system of FIG. 2b.

A reliability index is assigned to each of the values. FIG. 2b furthermore shows, by way of example, how nodes are assigned to such an estimation result in an adaptive characteristic map. $\Sigma_1$ through $\Sigma_3$ are assignment indices, assignment index $\Sigma_3$ being greater than assignment index $\Sigma_2$, and assignment index $\Sigma_2$ being greater than assignment index $\Sigma_1$. Line 24 indicates, by way of example, which ratios between brake pressure $p_{brake}$ and speed v were detected for establishing at least one value of vehicle axle-specific brake characteristic value function $C_p(v, p_{brake})$.

FIGS. 3A through 3C show coordinate systems for explaining a third specific embodiment of the method for determining at least one brake characteristic value of a hydraulic braking system of a vehicle.

The method shown with the aid of FIGS. 3A through 3C is a refinement of the specific embodiment of FIGS. 2a and 2b. In addition to the determination of at least one value of the particular vehicle axle-specific brake characteristic value function $C_p(z)$, an interpolation or a smoothing of vehicle axle-specific brake characteristic value function $C_p(z)$ is carried out in the specific embodiment described here to avoid steep/"jump-like" slopes/transition gradients of vehicle axle-specific brake characteristic value function $C_p(z)$. (Steep slopes of vehicle axle-specific brake characteristic value function $C_p(z)$ may result in "jerky" movement changes of the decelerated vehicle during the activation of the at least one braking system component of the hydraulic braking system and potentially of the electric motor of the vehicle.)

In addition or as an alternative to reliability index (trust ability index) $\Phi$, an aging index $\Omega$ may also be assigned to the at least one established value of vehicle axle-specific brake characteristic value function $C_p(v, p_{brake})$.

In the coordinate systems of FIGS. 3A through 3C, the abscissa is in each case a state variable z, which may be speed v of the vehicle, brake pressure $p_{brake}$ and/or the at least one braking system component temperature T, for example. In the coordinate systems of FIGS. 3Aa through 3Ca, the ordinate in each case shows the values of vehicle axle-specific brake characteristic value function $C_p(z)$, whereas the ordinate in the coordinate systems of FIGS. 3Ab through 3Cb in each case indicates aging index $\Omega$ determined for the values of vehicle axle-specific brake characteristic value function $C_p(z)$.

A new value $C_p(z_1)$ of vehicle axle-specific brake characteristic value function $C_p(z)$ is ascertained for state variable $z_1$ at a point in time $t_1$ shown with the aid of the coordinate systems of FIGS. 3Aa and 3Ab. An aging index $\Omega$ is also established for newly determined value $C_p(z_1)$. Since aging index $\Omega$ established for newly determined value $C_p(z_1)$ is comparatively high, newly determined value $C_p(z_1)$ is used for an interpolation/a smoothing of vehicle axle-specific brake characteristic value function $C_p(z)$. Newly determined value $C_p(z_1)$ may, in particular, be used for re-establishing adjoining values of vehicle axle-specific brake characteristic value function $C_p(z)$ with the aid of a linear interpolation or with the aid of a finite element calculation.

The particular value $C_p(z_2)$ of vehicle axle-specific brake characteristic value function $C_p(z)$ is re-established for a state variable $z_2$ at a later point in time $t_2$ (after point in time $t_1$) shown with the aid of the coordinate systems of FIGS. 3Ba and 3Bb. Since in this case newly determined value $C_p(z_2)$ also has a comparatively high aging index $\Omega$, value $C_p(z_2)$ may also be used for a re-establishment of the adjoining values of vehicle axle-specific brake characteristic value function $C_p(z)$. The values of vehicle axle-specific brake characteristic value function $C_p(z)$ at a point in time $t_3$ (after point in time $t_2$) are shown in the coordinate systems of FIGS. 3Ca and 3Cb.

FIGS. 4A through 4C show coordinate systems for explaining a fourth specific embodiment of the method for determining at least one brake characteristic value of a hydraulic braking system of a vehicle.

The method shown schematically with the aid of FIGS. 4A through 4C is a refinement of the above-described specific embodiment of FIGS. 3A through 3C, the coordinate systems of FIGS. 4A through 4C only showing aging index $\Omega$ of values of a vehicle axle-specific brake characteristic value function $C_p(z)$ (not shown) at different points in time $t_{11}$ through $t_{13}$. (In the coordinate systems of FIGS. 4A through 4C, the abscissa is in each case a state variable z, which may be speed v of the vehicle, brake pressure $p_{brake}$ and/or the at least one braking system component temperature T, for example.)

At a point in time $t_{11}$ shown with the aid of the coordinate system of FIG. 4A, aging indices $\Omega$ of the values of vehicle axle-specific brake characteristic value function $C_p(z)$ are all comparatively low. Later, at a point in time $t_{12}$ (after point in time $t_{11}$), values of vehicle axle-specific brake characteristic value function $C_p(z)$ are re-established for state variables $z_a$ and $z_b$, comparatively high aging indices $\Omega(z_a)$ and $\Omega(z_b)$ also being established for the newly determined values of vehicle axle-specific brake characteristic value function $C_p(z)$. FIG. 4C shows aging indices $\Omega(z_a)$ and $\Omega(z_b)$ at a later point in time $t_{13}$ (after point in time $t_{12}$), it being apparent that an "aging" of the values of vehicle axle-specific brake characteristic value function $C_p(z)$ re-established for state variables $z_a$ and $z_b$ is also taken into consideration by a reduction of aging indices $\Omega(z_a)$ and $\Omega(z_b)$ of state variables $z_a$ and $z_b$.

Figure 5:
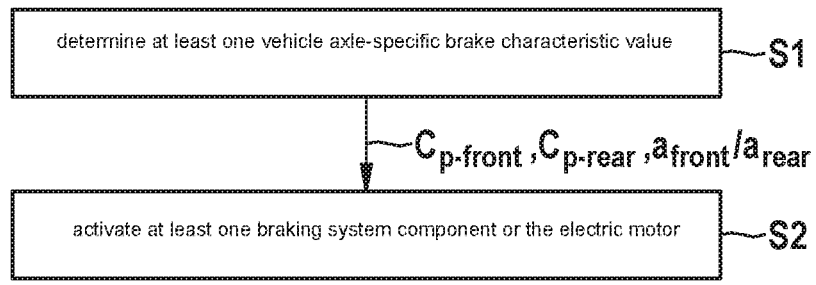
FIG. 5 shows a flow chart for explaining one specific embodiment of the method for decelerating a vehicle with a hydraulic braking system and an electric motor usable as a generator in accordance with the present invention.

FIG. 5 shows a flow chart for explaining one specific embodiment of the method for decelerating a vehicle with a hydraulic braking system and an electric motor usable as a generator.

In a method step S1 of the flow chart of FIG. 5, first at least one vehicle axle-specific brake characteristic value is determined. One of the above-described methods may be carried out, for example, for determining the at least one vehicle axle-specific brake characteristic value. In method step S1, preferably at least one front axle brake characteristic value $C_{p\text{-}front}$ for a front axle of the vehicle, at least one rear axle characteristic value $C_{p\text{-}rear}$ for a rear axle of the vehicle, and a quotient $a_{front}/(a_{front}+a_{rear})$ of a front axle deceleration $a_{front}$ exerted on the front axle of the vehicle with the aid of the front axle wheel brake cylinders, divided by a sum of front axle deceleration $a_{front}$ and a rear axle deceleration $a_{rear}$ exerted on the rear axle of the vehicle with the aid of the rear axle wheel brake cylinders, are determined.

If a driver of the vehicle or an automatic speed control unit of the vehicle requests a brake application of the vehicle, a further method step S2 is carried out. In method step S2, at least one braking system component of the hydraulic braking system and/or the electric motor is/are activated in such a way that the vehicle is decelerated with the aid of the hydraulic braking system and/or the electric motor. Preferably, a setpoint deceleration of the vehicle is adhered to in the process. During a deceleration of the vehicle solely with the aid of the electric motor, the setpoint deceleration may be adjusted with respect to at least one tolerance, such as a vehicle mass of the vehicle, an air resistance and/or a roadway gradient, and/or with respect to a vehicle model.

Moreover, in method step S2, the at least one vehicle axle-specific brake characteristic value is also taken into consideration during the activation of the at least one braking system component and/or of the electric motor. In this way, it is possible to suppress conventionally frequently occurring deceleration fluctuations during a change from a deceleration of the vehicle solely with the aid of the electric motor to a deceleration of the vehicle solely with the aid of its hydraulic braking system. For example, it is possible to establish at least one setpoint brake pressure variable with respect to at least one setpoint brake pressure to be set in the hydraulic braking system and/or a setpoint generator braking torque variable with respect to a setpoint generator braking torque to be effectuated with the aid of the electric motor for actuating the at least one braking system component and/or the electric motor, taking a braking intensity of the brake application of the vehicle which is instantaneously requested by the driver or the automatic speed unit into consideration, and additionally taking the at least one vehicle axle-specific brake characteristic value into consideration, the at least one established setpoint brake pressure variable and/or the established setpoint generator braking torque variable also being taken into consideration during the activation of the at least one braking system component and/or of the electric motor. With the aid of a variation of the at least one setpoint brake pressure to be set in the hydraulic braking system, it is possible to compensate for deviations of the at least one vehicle axle-specific brake characteristic value from a desired setpoint value. With the aid of a variation of the setpoint generator braking torque to be effectuated with the aid of the electric motor, it is also possible to already "adapt" a (sole) braking effect of the electric motor to the (sole) braking effect of the hydraulic braking system utilized for the deceleration of the vehicle after a deactivation of the electric motor.

The method described here thus advantageously contributes to the adherence to a high deceleration constancy during blending, i.e., during a change from a deceleration of the vehicle solely with the aid of the electric motor to a deceleration of the vehicle solely with the aid of its hydraulic braking system. A deceleration fluctuation, which conventionally is frequently perceived by the driver of the vehicle as an inexplicable "jerk" of the vehicle, thus does not have to be feared when carrying out the method described here.

The elimination of deceleration fluctuations while the method described here is being carried out may be verified with the aid of a comparison of the at least one actual variable X and the at least one setpoint variable $X_0$. However, if deceleration fluctuations are actually established based on the comparison, it is possible, based on the comparison of the at least one actual variable X to the at least one setpoint variable $X_0$, to re-establish at least one vehicle axle-specific brake characteristic value in such a way that a further occurrence of deceleration fluctuations is suppressed.

Figure 6:
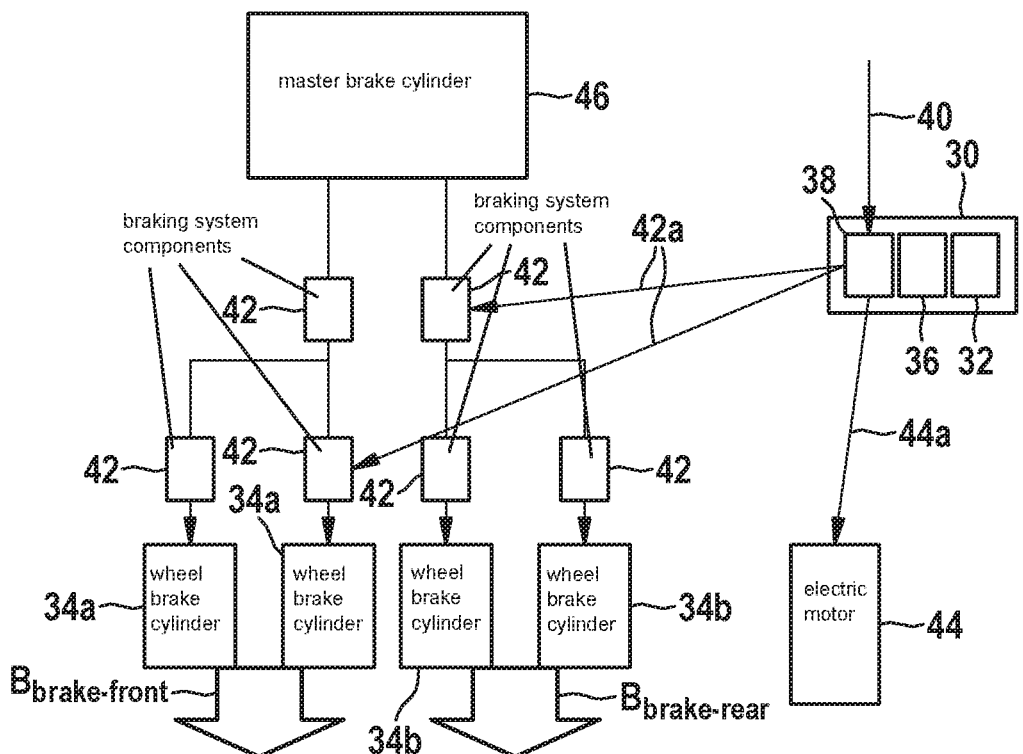
FIG. 6 shows a schematic representation of a hydraulic braking system equipped with one specific embodiment of the device according to the present invention for explaining an operating mode of the device in accordance with the present invention.

FIG. 6 shows a schematic representation of a hydraulic braking system equipped with one specific embodiment of the device according to the present invention for explaining an operating mode of the device.

It is expressly pointed out that a usability of device 30 described hereafter is not limited to a certain brake circuit split of the hydraulic braking system. The hydraulic braking system can have both an X-type brake circuit split and a parallel brake circuit split. Device 30/hydraulic braking system equipped therewith may also be used for a hybrid vehicle and for an electric vehicle.

Device 30 includes a processing unit 32, which is programmed to determine at least one brake characteristic value of the hydraulic braking system, processing unit 32 being programmed to determine the at least one brake characteristic value as a vehicle axle-specific brake characteristic value, which in each case corresponds to a ratio between a brake pressure in all wheel brake cylinders 34a or 34b assigned to a shared vehicle axle of the vehicle and a vehicle axle braking torque $B_{brake-front}$ or $B_{brake-rear}$ exerted on the shared vehicle axle with the aid of wheel brake cylinders 34a or 34b. In particular, processing unit 32 may be programmed to determine the at least one vehicle axle-specific brake characteristic value as a vehicle axle-specific brake characteristic value function, which is at least dependent on the brake pressure, on at least one vehicle state variable of the vehicle, on at least one driving state variable of an instantaneous trip of the vehicle, on at least one climatic state variable and/or on at least one braking system component temperature. Processing unit 32 may also be programmed to determine the at least one vehicle axle-specific brake characteristic value as a vehicle axle-specific brake characteristic value function, which is at least dependent on a time which has elapsed after an installation of a new brake pad of the hydraulic braking system or after an identified damage of a friction layer of the hydraulic braking system and/or a number of brake applications of the vehicle carried out after the installation of the new brake pad or after the identified damage of the friction layer.

Device 30 preferably includes a memory unit 36 on which the assigned vehicle axle-specific brake characteristic value or the assigned vehicle axle-specific brake characteristic value function is stored for the at least one vehicle axle of the vehicle. Moreover, processing unit 32 is preferably programmed to re-establish the assigned vehicle axle-specific brake characteristic value or the assigned vehicle axle-specific brake characteristic value function for the at least one vehicle axle, based on a comparison of at least one setpoint variable with respect to a setpoint deceleration to be exerted on the particular vehicle axle during a brake application of the vehicle to at least one actual variable with respect to an actual deceleration exerted on the particular vehicle axle during the brake application, and to newly store it on the memory unit 36. Processing unit 32 may also be designed/programmed to carry out further/all method steps of the methods described above.

As an advantageous refinement, device 30 may also include a control unit 38, which is designed to activate at least one braking system component 42 of the hydraulic braking system, and an electric motor 44 of the vehicle usable as a generator, taking at least one signal 40, which is output to control unit 38, with respect to a brake application of the vehicle requested by a driver of the vehicle or an automatic speed control unit of the vehicle, into consideration. The at least one braking system component 42 and electric motor 44 are preferably activatable with the aid of at least one control signal 42a and 44a of control unit 38 in such a way that the vehicle is deceleratable with the aid of its hydraulic braking system and/or its electric motor 44. The at least one activated braking system component 42 may, for example, be at least one valve of the hydraulic braking system, at least one pump motor of at least one pump of the hydraulic braking system and/or at least one motor of at least one plunger device of the hydraulic braking system, such as at least one motor of a (decoupled/decouplable) actuation system. Specifically, the actuation system may be an integrated power brake (IPB). For the sake of improved clarity, only master brake cylinder 46 of hydraulic braking system is still outlined in FIG. 6.

Control unit 38 is advantageously additionally designed to output the at least one control signal 42a and 44a, taking the at least one vehicle axle-specific brake characteristic value (provided/read out by memory unit 36) into consideration. For example, it is possible to compensate for deviations of the at least one vehicle axle-specific brake characteristic value from a desired setpoint value with the aid of a variation of the at least one setpoint brake pressure to be set in the hydraulic braking system by appropriately activating the at least one braking system component 42 of the hydraulic braking system. As an alternative or in addition, it is also possible, with the aid of a variation of an operation of the activated electric motor 44, to "adapt" its braking effect to deviations of the at least one vehicle axle-specific brake characteristic value from a desired setpoint value. During a use of control unit 38 described herein, almost no deceleration fluctuations are thus to be feared during a change from a deceleration of the vehicle solely with the aid of electric motor 44 to a deceleration of the vehicle solely with the aid of its hydraulic braking system.

What is claimed is:

1. A device for a hydraulic braking system of a vehicle, the device being configured to:
   determine at least one brake characteristic value of the hydraulic braking system, wherein the device is programmed to determine, for at least one vehicle axle of a plurality of vehicle axles, a respective vehicle axle-specific brake characteristic value, wherein each respective vehicle axle-specific brake characteristic value corresponds to a ratio between a brake pressure in all wheel brake cylinders assigned to a shared vehicle axle of the vehicle and a vehicle axle braking torque exerted on the shared vehicle axle using all the wheel brake cylinders assigned to the shared vehicle axle; and
   activate at least one of at least one braking system component of the hydraulic braking system and an electric motor of the vehicle usable as a generator, taking into consideration at least one of the vehicle axle-specific brake characteristic values.

2. The device as recited in claim 1, wherein the device is configured to determine the at least one vehicle axle-specific brake characteristic value as a vehicle axle-specific brake characteristic value function, which is at least dependent on the brake pressure.

3. The device as recited in claim 1, wherein the device is configured to determine the at least one vehicle axle-specific brake characteristic value as a vehicle axle-specific brake characteristic value function, which is at least dependent on at least one vehicle state variable of the vehicle, and/or on at least one driving state variable of an instantaneous trip of the vehicle, and/or on at least one climatic state variable, and/or on at least one braking system component temperature.

4. The device as recited in claim 1, wherein the device is configured to determine the at least one vehicle axle-specific brake characteristic value as a vehicle axle-specific brake characteristic value function, which is at least dependent on: (i) a time which has elapsed after an installation of a new brake pad of the hydraulic braking system or after an identified damage of a friction layer of the hydraulic braking system, and/or (ii) a number of brake applications of the vehicle carried out after the installation of the new brake pad or after the identified damage of the friction layer.

5. The device as recited in claim 2, wherein the device is configured to store the determined vehicle axle-specific brake characteristic value or the determined vehicle axle-specific brake characteristic value function is stored for the shared vehicle axle of the vehicle, the device being configured to re-establish the assigned vehicle axle-specific brake characteristic value or the assigned vehicle axle-specific brake characteristic value function for the shared vehicle axle, based on a comparison of at least one setpoint variable with respect to a setpoint deceleration to be exerted on the shared vehicle axle during a deceleration of the vehicle to at least one actual variable with respect to an actual deceleration exerted on the shared vehicle axle during a brake application, and to newly store it in the device.

6. The device as recited in claim 1, wherein the device is configured to take into consideration at least one signal with respect to a requested brake application of the vehicle, the at least one braking system component and the electric motor being activatable using at least one control signal of the device in such a way that the vehicle is deceleratable using its hydraulic braking system and/or its electric motor, and the device additionally being configured to output the at least one control signal, taking the at least one vehicle axle-specific brake characteristic value into consideration.

7. A hydraulic braking system for a vehicle, comprising:
   a device configured to determine at least one brake characteristic value of the hydraulic braking system, wherein the device is configured to determine, for at least one vehicle axle of a plurality of vehicle axles, a respective vehicle axle-specific brake characteristic value, wherein each respective vehicle axle-specific brake characteristic value corresponds to a ratio between a brake pressure in all wheel brake cylinders assigned to a shared vehicle axle of the vehicle and a vehicle axle braking torque exerted on the shared vehicle axle using all the wheel brake cylinders assigned to the shared vehicle axle;
   at least the wheel brake cylinders assigned to the shared vehicle axle of the vehicle; and
   the device being configured to activate at least one of at least one braking system component of the hydraulic braking system and an electric motor of the vehicle usable as a generator, taking into consideration at least one of the vehicle axle-specific brake characteristic values.

8. A method for determining at least one brake characteristic value of a hydraulic braking system of a vehicle, the method comprising:
   determining, for at least one vehicle axle of a plurality of vehicle axles, a respective vehicle axle-specific brake characteristic value, wherein each respective vehicle axle-specific brake characteristic value corresponds to a ratio between a brake pressure in all wheel brake cylinders assigned to a shared vehicle axle of the vehicle and a vehicle axle braking torque exerted on the shared vehicle axle with the aid of all the wheel brake cylinders assigned to the shared vehicle axle; and
   activating at least one of at least one braking system component of the hydraulic braking system and an electric motor of the vehicle usable as a generator, taking into consideration at least one of the vehicle axle-specific brake characteristic values.

9. A method for decelerating a vehicle with a hydraulic braking system and an electric motor usable as a generator, comprising:
   determining, for at least one vehicle axle of a plurality of vehicle axles, a respective vehicle axle-specific brake characteristic value, wherein each respective vehicle axle-specific brake characteristic value corresponds to a ratio between a brake pressure in all wheel brake cylinders assigned to a shared vehicle axle of the vehicle and a vehicle axle braking torque exerted on the shared vehicle axle with the aid of all the wheel brake cylinders assigned to the shared vehicle axle; and when a brake application of the vehicle is requested, activating at least one braking system component of the hydraulic braking system and/or of the electric motor in such a way that the vehicle is decelerated using the hydraulic braking system and/or the electric motor, at least one of the vehicle axle-specific brake characteristic values also being taken into consideration during the activation of the at least one braking system component and/or of the electric motor.

10. The method as recited in claim 9, further comprising:

establishing at least one setpoint brake pressure variable with respect to at least one setpoint brake pressure to be set in the hydraulic braking system and/or a setpoint generator braking torque variable with respect to a setpoint generator braking torque to be effectuated using the electric motor, for actuating the at least one braking system component and/or the electric motor, taking a braking intensity of the brake application of the vehicle which is instantaneously requested into consideration, and additionally taking the at least one vehicle axle-specific brake characteristic value into consideration, and the at least one established setpoint brake pressure variable and/or the established setpoint generator braking torque variable also being taken into consideration during the activation of the at least one braking system component and/or of the electric motor.

\* \* \* \* \*